United States Patent Office 2,757,565
Patented Aug. 7, 1956

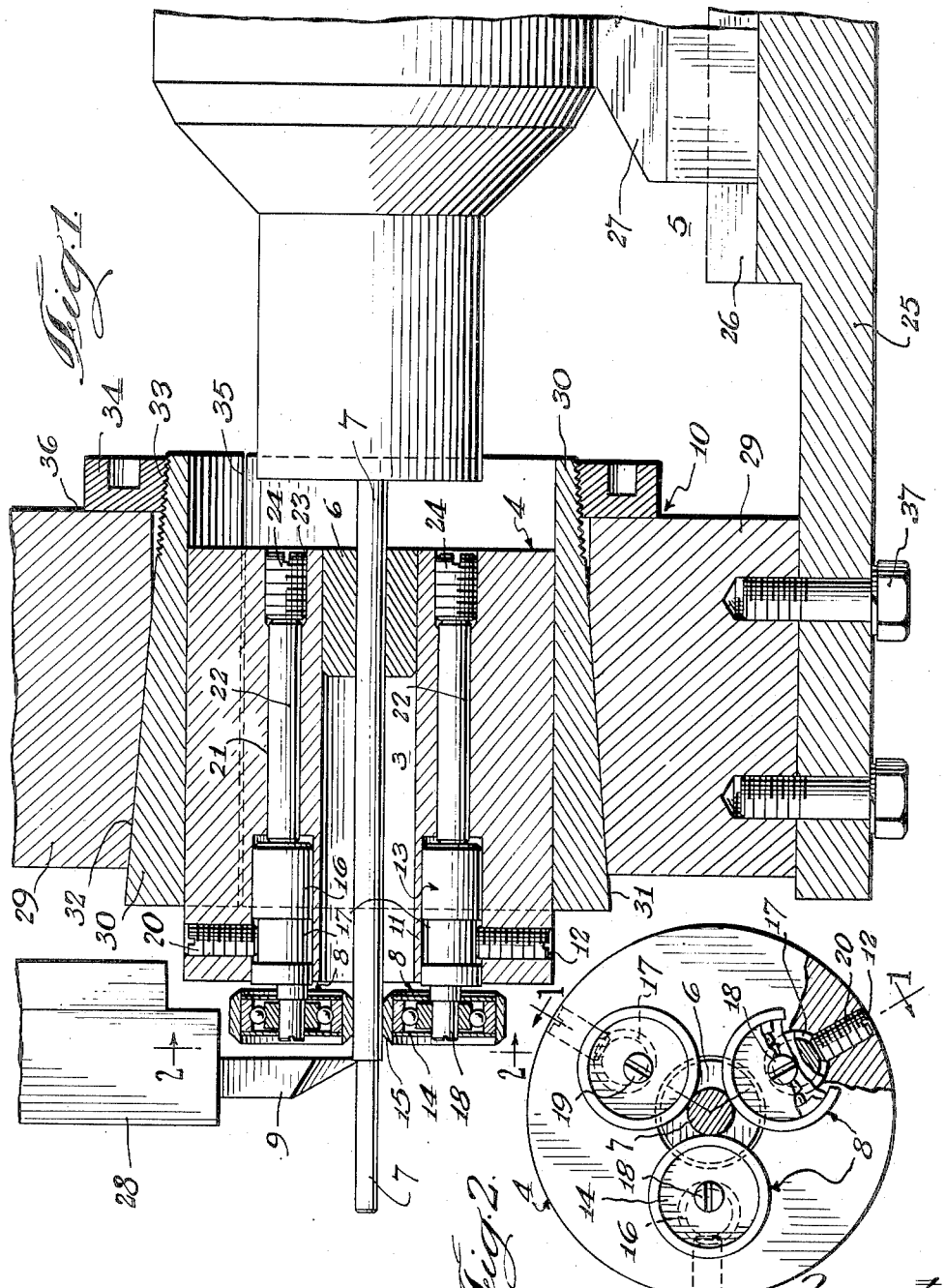

2,757,565

ANTI-FRICTION GUIDE BUSHING

Robert E. Fluskey and Edward E. Fluskey, Oak Park, Ill., assignors of one-half to John D. Gray, Evanston, Ill.

Application October 25, 1951, Serial No. 253,154

6 Claims. (Cl. 82—39)

The present invention relates to guide bushings and more particularly to an adjustable guide bushing for use with an automatic screw machine.

The adjustable guide bushing of the present invention is particularly adapted for use in a "Swiss-type" automatic screw machine. As generally used in the screw machine art, a "Swiss-type" automatic screw machine denotes an automatic screw machine having an axially sliding headstock, that is, the headstock, while holding and rotating the raw bar stock, moves longitudinally along a guideway on the machine frame. In this type of machine, the bar stock is generally guided in a bushing located between the turning tools and the headstock, which means that the bar stock is rigidly supported at all times close to the turning tools. This arrangement makes possible the turning of both very long and very short parts with extreme accuracy, unvarying concentricity, and a high finish. Short parts may also be turned in this type of machine without the guide bushing, that is directly in front of a usual collet in the headstock.

A great deal of attention has been given to the design of the various components of the "Swiss-type" automatic screw machine so as to achieve the highest accuracy in the parts being machined. The limiting feature in the accuracy to be achieved with this type of machine is governed by the closeness with which the guide bushing is able to engage the raw material or bar stock. Considerable thought has therefore been given to the design of guide bushings for these machines. Various types of precision guide bushings have been used, both solid and adjustable, and made out of a variety of materials such as close-grain cast iron, high carbon tool steel, carbides, etc., however, none have proved entirely satisfactory. The bushings are expensive to manufacture, and possess a potential danger of seizure or binding between the bar stock and the guide bushing. When seizure occurs, usually the guide bushing, turning tools, collet, and the part being machined are destroyed. Furthermore, the most useful of these bushings require critical materials such as carbides, which are not only costly, but often impossible to obtain.

The principal object of the present invention is to provide a guide bushing for "Swiss-type" automatic screw machines in which the danger of seizure between the bar stock and the guide bushing is substantially eliminated. Further objects of the present invention are to provide an inexpensive guide bushing for "Swiss-type" automatic screw machines which has a minimum number of working parts which are easily replaceable in the event of wear, which may be adjustable for varying diameters of bar stock, and which guides the bar stock to the cutting tool with extreme precision. Other objects and advantages of the invention will become clear from the following description of one preferred embodiment of the apparatus and the accompanying drawings thereof.

In the drawings:

Fig. 1 is an elevational view partially in section of a portion of a "Swiss-type" automatic screw machine showing a guide bushing, embodying various features of the present invention, mounted on the machine. The view of the guide bushing in this figure is taken along lines 1—1 of Fig. 2.

Fig. 2 is an end view of the guide bushing taken along lines 2—2 of Fig. 1 with a portion cut away to show one of the securing screws tightened against its associated eccentric pin.

The guide bushing 3, illustrated in Figs. 1 and 2, includes a longitudinally extending tubular body section 4, which is adapted to be axially positioned within an automatic screw machine 5. A fixed bushing 6 attached to one end of the body section 4 partially guides a piece of raw bar stock 7 through the guide bushing 3, and adjustable bearing means 8 attached to the other end of the guide bushing 3 accurately guides the bar stock 7 at a point adjacent a cutting tool 9 of the screw machine 5.

Although the illustrated embodiment of the present invention includes the fixed bushing 6, it should be understood that the guide bushing 3 would generally operate effectively without this fixed bushing 6. The bushing 6 is useful when one is working with extremely long lengths of stock, in which case the rapid rotation of the head stock may have a tendency to cause the free end of the stock to deviate from the axis of the head stock. The bushing 6 will then substantially eliminate any whipping of the end of the bar stock and thereby reduce the strain which would otherwise be transmitted to the bearing means 8.

The tubular body section 4 is made out of material such as alloy steel and is proportioned to fit within a supporting unit 10 of the automatic screw machine 5. The body section 4 includes three symmetrically located, longitudinal recesses 11 preferably set 120° apart as illustrated, and three threaded radial passageways 12 which connect with the recesses 11 for retaining and positioning the adjustable bearing means 8 which guides the bar stock 7 at a point adjacent the cutting tool 9. The inner diameter of the body section 4 is somewhat larger than the bar stock 7 to be machined so as to be able to enclose the fixed bushing 6 for partially guiding the bar stock 7 through the guide bushing 3.

The bushing 6 is made out of material such as cast iron and is proportioned so as to be press-fitted with very little force into the body section 4. The bushing 6 acts as a partial support for the bar stock 8 being machined and has an inner diameter which is a few thousandths of an inch larger than the diameter of the bar stock 7 so that there is no tendency for the bar stock to freeze within the bushing 6 during rotation. Different bushings 6 can be inserted into the body section to accommodate different diameters of bar stock 7.

The adjustable bearing means 8 includes eccentric pins 13 which have rollers 14 mounted by means such as a press fit on one end thereof for providing a bearing for the bar stock 7 adjacent the cutting tool 9. The rollers 14 are preferably standard, enclosed, anti-friction ball bearings, as shown in Fig. 1, so as to provide a minimum amount of resistance for the turning bar stock 7. The corners of the rollers are chamfered as shown at 15 so as to guide the bar stock 7 to be machined into the rollers 14.

The eccentric pins 13 are made out of hardened high carbon steel or the like and include generally cylindrical sections 16 which are provided with portions of reduced diameter 17 and radially offset cylindrical arm sections 18 which are integral with the cylindrical sections 16. The cylindrical sections 16 of the eccentric pins 13 are proportioned so as to slideably fit within the longitudinal recesses 11 of the body section 4. The arm sections 18 extend through the rollers 14 as shown in Fig. 1 and their outer ends are provided with slots 19 for rotating the eccentric pins 13 so as to alter the radial position of the rollers 14.

Each of the eccentric pins 13 may be locked in position by securing screws 20 which extend through the threaded radial passageways 12 in the body section 4. The securing screws 20 may be tightened against the portions 17 of the eccentric pins 13, thereby locking the eccentric pins 13 in a fixed position.

For most machining operations, it is unnecessary to alter the longitudinal position of the rollers 14, however for special machining operations, for example, when operating simultaneously with several cutting tools, it may be desirable to individually adjust the longitudinal position of the rollers 14. To accomplish this result, the body section 4 may include three symmetrically located, longitudinal passageways 21 which connect with the recesses 11. The passageways 21 are proportioned so as to slideably support adjusting pins 22 and have enlarged threaded portions 23 for retaining adjusting screws 24. The longitudinal position of the eccentric pins 13 and rollers 14 may be adjusted by rotating the adjusting screws 24 which thread into the enlarged threaded portions 23 of the passageways 21. The adjusting screws 24 bear against the adjusting pins 22 which are made of high carbon steel or the like and which slideably fit in the passageways 21 between the adjusting screws 24 and the eccentric pins 13. When the securing screws 20 are partially loosened, the eccentric pins 13 can be pressed against the adjusting pins 22 which in turn press against the adjusting screws 24 thereby determining the longitudinal position of the eccentric pins 13.

In operation, the guide bushing 3 which is initially detached from the automatic screw machine 5 is adjusted with the aid of a piece of raw bar stock 7. The securing screws 20 are first partially loosened and a short piece of the bar stock 7 is inserted through the bushing 6 and rollers 14 of the guide bushing 3. The eccentric pins 13 are carefully adjusted by rotating the slots 19 until each of the individual rollers 14 are positioned on the outside diameter of the bar stock 7. If the guide bushing includes the longitudinal adjusting means, the longitudinal position of the rollers 14 may be set by regulating the adjusting screws 24 and pressing the eccentric pins 13 towards the adjusting screws 24. The securing screws 20 are then tightened thereby locking the eccentric pins 13 in position within the guide bushing 3. The guide bushing 3 is then ready for insertion into the automatic screw machine 5 adjacent the cutting tool 9.

The guide bushing 3 may be axially positioned in an ordinary manner in any automatic screw machine, e. g. as shown in the screw machine 5 shown in Fig. 1. The illustrated automatic screw machine 5 includes a frame 25, a longitudinally extending guideway 26, a headstock 27 which slides along the guideway 26, a tool holder 28, and the supporting unit 10. The supporting unit 10 includes a support member 29 which is attached to the frame 25 by screws 37 and coacts with a retaining ring 30 extending through the support member 29 to clamp the guide bushing 3 in place on the screw machine 5. The outer wall 31 of the retaining ring 30 is tapered so as to interfit with a tapered opening 32 in the support member 29 and includes a threaded portion 33 at its narrow end which is engaged by a lock nut 34. The retaining ring 30 is proportioned to extend around the generally cylindrically-shaped guide bushing 3 and is split as shown at 35, so as to permit the retaining ring 30 to be tightened about the guide bushing 3. The lock nut 34 is proportioned to bear against the transverse face 36 of the support member 29 when the lock nut 34 is tightened on the retaining ring 30.

In assembling the guide bushing 3 in the automatic screw machine 5, the guide bushing 3 is placed within the retaining ring 30 which is loosely held within the support member 29 by the lock nut 34. The lock nut 34 is then tightened on the retaining ring 30. As the lock nut 34 tightens, the retaining ring 30 is forced through the support member 29 towards the headstock 27 causing a decrease in the diameter of the retaining ring 30. Eventually, the retaining ring 30 tightens securely around the guide bushing 3 whereupon the members of the assembly become firmly locked in position.

The guide bushing 3, described above, is economical to manufacture and increases the accuracy obtainable in the parts being machined. The guide bushing 3 is adaptable with the aid of different bushings 6 to accommodate varying sizes of bar stock 7, and possesses no tendency of seizure between the rotating bar stock 7 and the guide bushing 3.

Various of the novel features of the present invention which are believed to be new are set forth below.

We claim:

1. A guide bushing comprising a generally tubular body section, a tubular bushing extending within one end of said body section for guiding a piece of bar stock, and adjustable bearing means connected to said body section at the other end thereof for accurately positioning and guiding said bar stock at a point adjacent said cutting tool, said adjustable bearing means including a plurality of eccentric pins, each of which has a cylindrical section and an integral offset arm section, each of said cylindrical sections extending into longitudinal recesses in said body section at a point opposite said tubular bushing, a roller attached to each of said offset arm sections outwardly of said body section, means whereby said eccentric pins within said body section may be rotated to thereby change the radial position of said rollers, each of said cylindrical sections having a portion of reduced diameter, said body section having threaded radial passageways which extend from the surface of said body section to said longitudinal recesses, and securing screws within said radial passageways which are adapted to engage said cylindrical sections of said eccentric pins at the portions of reduced diameter for locking said eccentric pins in a fixed position.

2. A guide bushing comprising a generally tubular body section, a tubular bushing extending within one end of said body section for guiding a piece of bar stock, and adjustable bearing means connected to said body section at the other end thereof for accurately positioning and guiding said bar stock at a point adjacent said cutting tool, said adjustable bearing means including a plurality of eccentric pins, each of which has a cylindrical section and an integral offset arm section, each of said cylindrical sections extending into longitudinal recesses in said body section at a point opposite said tubular bushing, a roller attached to each of said offset arm sections outwardly of said body section, means whereby said eccentric pins within said body section may be rotated to thereby change the radial position of said rollers, each of said cylindrical sections having a portion of reduced diameter, said body section having threaded radial passageways which extend from the surface of said body section to said longitudinal recesses, securing screws within said radial passageways which are adapted to engage said cylindrical sections of said eccentric pins at the portions of reduced diameter for locking said eccentric pins in a fixed position, a plurality of longitudinal passageways in said body section which connect with said longitudinal recesses, a longitudinal adjusting pin within each of said longitudinal passageways adjacent said eccentric pins and adjusting screws within threaded portions of said longitudinal passageways adjacent the end of said body section which includes said tubular bushing for adjusting the longitudinal position of said eccentric pins and said rollers.

3. A guide bushing comprising a generally tubular body section, adjustable bearing means connected to said body section for accurately positioning and guiding said bar stock at a point adjacent said cutting tool, said adjustable bearing means including a plurality of eccentric pins, each of which has a cylindrical section and an integral offset arm section, each of said cylindrical sections extending into longitudinal recesses in said body section at one end thereof, a roller attached to each of said offset arm sections outwardly of said body section, means whereby said eccentric pins within said body section may be rotated to thereby change the radial position of said rollers, each of said cylindrical sections having a portion of reduced diameter, said body section having threaded radial passageways which extend from the surface of said body section to said longitudinal recesses, and securing screws within said radial passageways which are adapted to engage said cylindrical sections of said eccentric pins at the portions of reduced diameter for locking said eccentric pins in a fixed position.

4. A guide bushing comprising a generally tubular body section, adjustable bearing means connected to said body section for accurately positioning and guiding said bar stock at a point adjacent said cutting tool, said adjustable bearing means including a plurality of eccentric pins, each of which has a cylindrical section and an integral offset arm section, each of said cylindrical sections extending into longitudinal recesses at one end of said body section, a roller attached to each of said offset arm sections outwardly of said body section, means whereby said eccentric pins within said body section may be rotated to change the radial position of said rollers, each of said cylindrical sections having a portion of reduced diameter, said body section having threaded radial passageways which extend from the surface of said body section to said longitudinal recesses, securing screws within said radial passageway which are adapted to engage said cylindrical sections of said eccentric pins at the portions of reduced diameter for locking said eccentric pins in a fixed position, a plurality of longitudinal passageways in said body section which connect with said longitudinal recesses, a longitudinal adjusting pin within each of said longitudinal passageways adjacent said eccentric pins and adjusting screws within threaded portions of said longitudinal passageways adjacent the opposite end of said body section from said longitudinal recesses for adjusting the longitudinal position of said eccentric pins and said rollers.

5. A guide bushing comprising a body, a plurality of generally parallel guideways extending into one face of said body and located in spaced position around a circle, a cylindrical member within each of said guideways which is rotatable and slidable in its guideway, a roller mounted on each of said cylindrical members eccentrically of the axis thereof whereby the cylindrical members may be rotated to change the radial positions of the rollers, means adjustable longitudinally of the guideways for limiting the sliding movement of each of the cylindrical members to determine the relative longitudinal positions of the rollers, and means for locking each of the cylindrical members in fixed position in its guideway to prevent the sliding and rotating movement of the cylindrical members and to fix the rollers in their adjusted position.

6. A guide bushing comprising a body, a tubular bushing extending into one face of said body for guiding a piece of bar stock, a plurality of generally parallel bores extending into the other face of the body and located in spaced position around a circle, a cylindrical member within each of said bores which is rotatable and slidable in its bore, a roller mounted on each of said cylindrical members eccentrically of the axis thereof whereby the cylindrical members may be rotated to change the radial positions of the rollers, means adjustable longitudinally of the bores for limiting the sliding movement of each of the cylindrical members to determine the relative longitudinal positions of the rollers, and means for locking each of the cylindrical members in fixed position in its bore to prevent the sliding and rotating movement of the cylindrical members and to fix the rollers in their adjusted position.

References Cited in the file of this patent

UNITED STATES PATENTS

| | | |
|---|---|---|
| 391,533 | Howard | Oct. 23, 1888 |
| 805,539 | Gylfe | Nov. 28, 1905 |
| 968,489 | Milne | Aug. 23, 1910 |
| 1,240,221 | Katzmarek | Sept. 18, 1917 |
| 1,274,436 | Murphy | Aug. 6, 1918 |
| 1,736,972 | Hutchinson | Nov. 26, 1929 |
| 2,114,978 | Horger | Apr. 19, 1938 |
| 2,608,121 | Fellroth | Aug. 26, 1952 |

FOREIGN PATENTS

| | | |
|---|---|---|
| 647,777 | Great Britain | Dec. 20, 1950 |